United States Patent
Kim et al.

(10) Patent No.: US 8,249,253 B2
(45) Date of Patent: Aug. 21, 2012

(54) SEMICONDUCTOR INTEGRATED CIRCUIT HAVING ENCRYPTER/DECRYPTER FUNCTION FOR PROTECTING INPUT/OUTPUT DATA TRANSMITTED ON INTERNAL BUS

(75) Inventors: Chan-Yong Kim, Kyunggi-do (KR); Jong-Rok Kim, Sungnam-shi (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 2398 days.

(21) Appl. No.: 10/128,839

(22) Filed: Apr. 23, 2002

(65) Prior Publication Data

US 2003/0048900 A1    Mar. 13, 2003

(30) Foreign Application Priority Data

Aug. 30, 2001 (KR) .................................. 2001-52927

(51) Int. Cl.
*H04L 9/00* (2006.01)
(52) U.S. Cl. ........ 380/229; 380/239; 380/268; 380/287; 713/190; 713/191; 726/2
(58) Field of Classification Search .................. 380/229, 380/239, 268, 287; 713/190, 191; 726/2
See application file for complete search history.

(56) References Cited

U.S. PATENT DOCUMENTS

| | | | | |
|---|---|---|---|---|
| 5,442,704 A * | 8/1995 | Holtey | ........................... | 711/163 |
| 5,539,825 A * | 7/1996 | Akiyama et al. | ................. | 705/68 |
| 5,623,637 A * | 4/1997 | Jones et al. | .................... | 711/164 |
| 5,778,073 A * | 7/1998 | Busching et al. | ............... | 380/33 |
| 5,850,452 A | 12/1998 | Sourgen et al. | | |
| 6,038,551 A * | 3/2000 | Barlow et al. | ................... | 705/41 |
| 6,089,460 A * | 7/2000 | Hazama | ........................ | 235/492 |
| 6,182,217 B1 | 1/2001 | Sedlak | | |
| 6,289,455 B1 * | 9/2001 | Kocher et al. | ................. | 713/194 |
| 6,779,112 B1 * | 8/2004 | Guthery | ........................ | 713/172 |
| 6,789,192 B2 * | 9/2004 | Hirota et al. | .................. | 713/172 |
| 2002/0194134 A1 * | 12/2002 | Ohtsuka | .......................... | 705/57 |
| 2006/0088158 A1 * | 4/2006 | Murray | ........................... | 380/43 |

FOREIGN PATENT DOCUMENTS

EP           0720098           7/1996

(Continued)

OTHER PUBLICATIONS

Kommerling et al. "Design Principles for Tamper-Resistant Smartcard Processors" paper, USENIX Workshop on Smartcard Technology, May 10-11, 1999. http://citeseer.ist.psu.edu/kommerling99design.html.*

(Continued)

*Primary Examiner* — Saleh Najjar
*Assistant Examiner* — Joseph Pan
(74) *Attorney, Agent, or Firm* — F. Chau & Associates, LLC

(57) ABSTRACT

A semiconductor integrated circuit is provided, which includes: a first circuit; a second circuit; a data BUS; and first and second encryption/decryption circuits for encrypting/decrypting data transmitted between the first and second circuits on the data bus. The first encryption/decryption circuit is for encrypting data output from the first circuit, outputting the encrypted data to the data BUS, decrypting an encrypted data received from the second encryption/decryption circuit, and providing the decrypted data to the first circuit. The second encryption/decryption circuit is for decrypting the encrypted data received from the first encryption/decryption circuit, providing the decrypted data to the second circuit, encrypting data output from the second circuit, and outputting the encrypted data to the data BUS.

37 Claims, 6 Drawing Sheets

FOREIGN PATENT DOCUMENTS

| | | |
|---|---|---|
| JP | 06-035806 | 2/1994 |
| JP | 07-287742 | 10/1995 |
| JP | 2000-259799 | 9/2000 |
| WO | WO 01/40950 A2 | 6/2001 |
| WO | 01/54083 | 7/2001 |

OTHER PUBLICATIONS

C.K. Koc, et al., "Fast Primitives for Internal Data Scrambling in Tamper Resistant Hardware" Hardware and Embedded Systems—CHES 2001, vol. 2162 of Lecture Notes in Computer Science, Verlag, 2001.

* cited by examiner

SEMICONDUCTOR INTEGRATED CIRCUIT HAVING ENCRYPTER/DECRYPTER FUNCTION FOR PROTECTING INPUT/OUTPUT DATA TRANSMITTED ON INTERNAL BUS

RELATED APPLICATION

This application claims priority to Korean Patent Application No. 2001-52927, filed on Aug. 30, 2001, the contents of which are herein incorporated by reference in their entirety.

FIELD OF THE INVENTION

The present invention relates to a semiconductor integrated circuit and, more particularly, to a semiconductor integrated circuit having an encrypter/decrypter function for protecting input/output data transmitted on an internal bus.

BACKGROUND OF THE INVENTION

The use of plastic cards such as credit cards or bank cards for performing, e.g., financial transactions, is becoming increasingly popular. As is well known, a conventional plastic card including a magnetic card can't store a large quantity of data and has a problem in security. As semiconductor technology has been remarkably developed, the size of integrated circuits (ICs) have become increasingly reduced. Consequently, plastic cards having an IC chip (called "a smart card") have been developed to replace the conventional magnetic card. The smart card can store a very large quantity of data and has advantages such as enhanced security and durability. Accordingly, the smart card has been used for various purposes such as an identification card, a health insurance card, and a bank card.

Since important data such as a credit card number, a resident registration number, a bank account number, and a password are stored in the IC of a smart card, security with respect to the data stored in the IC is very important.

FIG. 1 is a diagram of an exemplary IC for a smart card. An IC 10 in the smart card includes a central processing unit (CPU) or a processor 11 such as a microprocessor, a random access memory (RAM) 13, a read only memory (ROM) 14, an electrically erasable and programmable ROM (EEPROM) 15, and an input/output controller 12. The circuit blocks in the IC 10 are connected to one another through a system BUS 16, thereby transmitting and receiving data, programs, and controlling codes.

Those who are skilled in the art related to an IC can easily distinguish circuit blocks from a system BUS and monitor data loaded on the system BUS by using a predetermined means. If data transmitted and received among the circuit blocks is exposed to a hacker and abused, a serious social problem will be occurred.

Thus, it is highly desirable for a smart card which is used as a credit card, a health insurance card, and an identification card to have functions capable of retaining security of data transmitted and received among internal circuit blocks.

SUMMARY OF THE INVENTION

A semiconductor integrated circuit is provided, which includes: a first circuit; a second circuit; a data BUS; and first and second encryption/decryption circuits for encrypting/decrypting data transmitted between the first and second circuits on the data bus, wherein the first encryption/decryption circuit for encrypting data output from the first circuit, outputting the encrypted data to the data BUS, decrypting an encrypted data received from the second encryption/decryption circuit, and providing the decrypted data to the first circuit, and the second encryption/decryption circuit for decrypting the encrypted data received from the first encryption/decryption circuit, providing the decrypted data to the second circuit, encrypting data output from the second circuit, and outputting the encrypted data to the data BUS.

According to an embodiment of the present invention, the semiconductor integrated circuit further includes a random number generator for generating a random number in response to a clock signal, and providing the random number to the first encryption/decryption circuit and the second encryption/decryption circuit to control execution of the encrypting and decrypting operations. The random number generator is included in a circuit block associated with one of the first encryption/decryption circuit and the second encryption/decryption circuit.

A semiconductor integrated circuit is also provided, which includes: a first circuit block including a processor circuit; a second circuit block including a storage circuit; and a data BUS for transmitting data between the first and second circuit blocks, wherein the first circuit block further includes a random number generator for generating a random number in response to a clock signal, and a first encryption/decryption circuit for encrypting data output from the processor circuit according to a random number generated from the random number generator, outputting the encrypted data to the data BUS, decrypting encrypted data received from the storage circuit over the data BUS, and providing the decrypted data to the processor circuit; and wherein the second circuit block further includes a second encryption/decryption circuit for decrypting the encrypted data received from the processor circuit over the data BUS according to a random number generated from the random number generator, providing the decrypted data to the storage circuit, encrypting data output from the storage circuit according to the random number, and outputting the encrypted data to the data BUS.

A semiconductor integrated circuit is also provided, which includes: a first circuit; a second circuit; a data BUS for transmitting a plurality of data bits between the first and second circuits; a random number generator for generating a random number in response to a clock signal; a first scrambler for changing an array of the plurality of data bits output from the first circuit based on the random number, providing the changed array to the data BUS, restoring an array of the plurality of data bits received from the second circuit over the data BUS to an original array based on the random number, and providing the restored array to the first circuit, and a second scrambler for restoring the array of plurality of data bits received from the first circuit over the data BUS to an original array based on the random number, providing the restored array to the second circuit, changing the array of the plurality of data bits output from the second circuit based on the random number, and outputting the changed array to the data BUS.

According to an embodiment of the present invention, the plurality of data bits are N bits, wherein the N is integer. The first scrambler includes: a first generator for generating first selecting signals corresponding to the random number; and a first bit array changer for changing the array of plurality of data bits output from the first circuit based on the first selecting signals, outputting the changed array to the data BUS, restoring the array of plurality of data bits received from the second circuit over the data BUS to the original array based on the first selecting signals, and providing the restored array to the first circuit. The first bit array changer includes a plurality of first switching circuits corresponding to transmitting and receiving the plurality of data bits, respectively, each of the plurality of first switching circuits for connecting a corresponding one of the plurality of data bits input/output to/from the first circuit with a bit corresponding to the first selecting signals out of bits of the data BUS. Each of the plurality of first switching circuits: outputs a corresponding one of the plurality of data bits output from the first circuit when data is output from the first circuit, as a bit corresponding to the first selecting signals out of bits of the data BUS, and provides a bit corresponding to the first selecting signals out of data bits loaded on the data BUS when data is input from the data BUS, as a corresponding one of the plurality of data bits input to the first circuit. Each of the plurality of first switching circuits includes a plurality of switches that are connected between a plurality of bits of the data BUS and a corresponding one of plurality of data bits input/output to/from the first circuit, respectively, for operating in response to the first selecting signals. The second scrambler includes: a second generator for generating second selecting signals corresponding to the random number; and a second bit array changer for restoring the array of plurality of data bits received from the first circuit over the data BUS to the original array based on the second selecting signals, providing the restored array to the second circuit, changing the array of data bits output from the second circuit based on the second selecting signals, and outputting the changed array to the data BUS. The first selecting signals and the second selecting signals are identical with each other. The second bit array changer includes a plurality of second switching circuits corresponding to the transmitted and received data bits, each of the second switching circuits for connecting a corresponding one of data bits input/output to/from the second circuit with bits corresponding to the second selecting signals out of bits of the data BUS.

According to an embodiment of the present invention, each of the second switching circuits: outputs a corresponding one of data bits output from the second circuit when data is output from the second circuit, as a bit corresponding to the second selecting signal out of bits of the data BUS, and provides a bit corresponding to the second selecting signals out of data bits loaded on the data BUS when data is input from the data BUS, as a corresponding one of data bits input to the second circuit. Each of the second switching circuits includes a plurality of switches that are connected between a plurality of bits of the data BUS and a corresponding one of data bits input/output to/from the second circuit, respectively, for operating in response to the second selecting signals.

A smart card is also provided, which includes: a first circuit; a second circuit; a data BUS for transmitting a plurality of data bits between the first and second circuit; a random number generator for generating a random number in response to a clock signal; a first scrambler for changing an array of the plurality of data bits output from the first circuit based on random number, outputting the changed array to the data BUS, restoring an array of the plurality of data bits received from the second circuit over the data BUS to an original array based on the random number, and providing the restored array to the first circuit; and a second scrambler for restoring an array of the plurality of data bits received from the first circuit over the data BUS to an original array based on the random number, providing the restored data to the second circuit, changing an array of the plurality of data bits output from the second circuit based on the random number, and outputting the changed array to the data BUS.

A semiconductor integrated circuit is also provided, which includes: a first circuit; a second circuit; a data BUS for transmitting a plurality of data bits between the first and second circuit; a random number generator for generating a random number in response to a clock signal; a first scrambler for partially changing an array of the plurality of data bits output from the first circuit based on the random number and outputting the changed array to the data BUS; and a second scrambler for restoring the array data bits whose array is changed by the first scrambler, out of data bits input from the first circuit through the data BUS based on the random number to an original array, providing the restored array to the second circuit, partially changing an array out of data bits output from the second circuit based on the random number, and outputting the changed array to the data BUS, wherein the first scrambler restores some bits whose array is changed by the second scrambler, out of data bits input from the second circuit over the data BUS based on the random number, to an original array, and provides the restored array to the first circuit.

According to an embodiment of the present invention, the first scrambler includes: a first generator for generating first selecting signals corresponding to the random number; and a first bit array changer for partially changing the array of data bits output from the first circuit according to the first selecting signals, outputting the changed array to the data BUS, restoring the array of some bits whose array is changed by the second scrambler, out of data bits input from the second circuit block through the data BUS based on the first selecting signals, to an original array, and providing the restored array to the first circuit. The second scrambler includes: a second generator for generating second selecting signals corresponding to the random number; and a second bit array changer for restoring the array of some bits whose array is changed by the first scrambler, out of data bits input from the first circuit over the data BUS the original array based on the second selecting signals, providing the restored array to the second circuit, partially changing the array of data bits output from the second circuit based on the second selecting signals, and outputting the changed array to the data BUS. Data transmitted and received between the first and second circuits through the data BUS includes N bits, and bits whose bit array is changed/restored by the first and second bit array changers, out of the N bits data are K low order bits (K<N), wherein the K and N are integer. The first bit array changer includes a plurality of first switching circuits corresponding to bits of the K-bit data, each of the first switching circuits for connecting corresponding bits out of K low order bits of data input/output to/from the first circuit, to a bit corresponding to the first selecting signals out of K low order bits of the data BUS. Each of the first switching circuits: outputs a corresponding one of K low order bits of data output from the first circuit when data is output from the first circuit, as a bit corresponding to the first selecting signals out of K low order bits of the data BUS, and provides a bit corresponding to the first selecting signals out of data bits loaded on the data BUS when data is input from the data BUS, as a corresponding one of data bits input to the first circuit. Each of the first switching circuits includes a plurality of switches that are connected between K low order bits of the data BUS and a corresponding one of K low order bits of data input/output to/from the first circuit, respectively, for operating in response to the first selecting signals. The second bit array changer includes a plurality of second switching circuits corresponding to K bits data, respectively, each of the second switching circuits for connecting a corresponding one of K low order bits of data input/output to/from the second circuit, to a bit corresponding to the second selecting signals out of K low order bits of the data BUS. Each of the second switching circuits: outputs a corresponding one of K low order bits of data output from the second circuit when data is output from the second circuit, as a bit corresponding to the second selecting signals out of K low order bits of the data BUS, and provides a bit corresponding to the second selecting signals out of K low order bits of data loaded on the data BUS when data is input from the data BUS, as a corresponding one of K low order bits of data input to the second circuit. Each of the second switching circuits includes a plurality of switches that are connected between K low order bits of the data BUS and a corresponding one of K low order bits of data input/output to/from the second circuit, respectively, for operating in response to the second selecting signals.

A method of transmitting internal data of a semiconductor memory device having one chip composed of a first circuit block, a second circuit block, and a data BUS for transmitting data between the first and second circuit blocks is provided, the method includes the steps of: outputting data using the first circuit block; changing a bit array of the data output from the first circuit block; transmitting the data whose bit array is changed to the data BUS; restoring a bit array of data loaded on the data BUS to an original array; and outputting the data whose bit array is restored, to the second circuit block.

According to an embodiment of the present invention, the step of changing the bit array changes some bits out of data output from the second circuit block, and the step of restoring the bit array restores bits whose bit array is changed in the step of changing the bit array, out of the data loaded on the data BUS, to the original array. The method further includes the steps of: outputting data using the second circuit block; changing a bit array of the data output from the second circuit; transmitting the data whose bit array is changed to the data BUS; restoring a bit array of data loaded on the data BUS, to an original array; and inputting the data whose bit array is restored, to the first circuit block. The step of changing the bit array of data changes some bits out of data output from the second circuit block, and the step of restoring the bit restores bits whose bit array is changed in the step of changing the bit array to the original array.

BRIEF DESCRIPTION OF THE DRAWINGS

The above objects and advantages of the present invention will become more apparent by describing in detail preferred embodiments thereof with reference to the attached drawings in which.

DESCRIPTION OF PREFERRED EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

Figure 1:
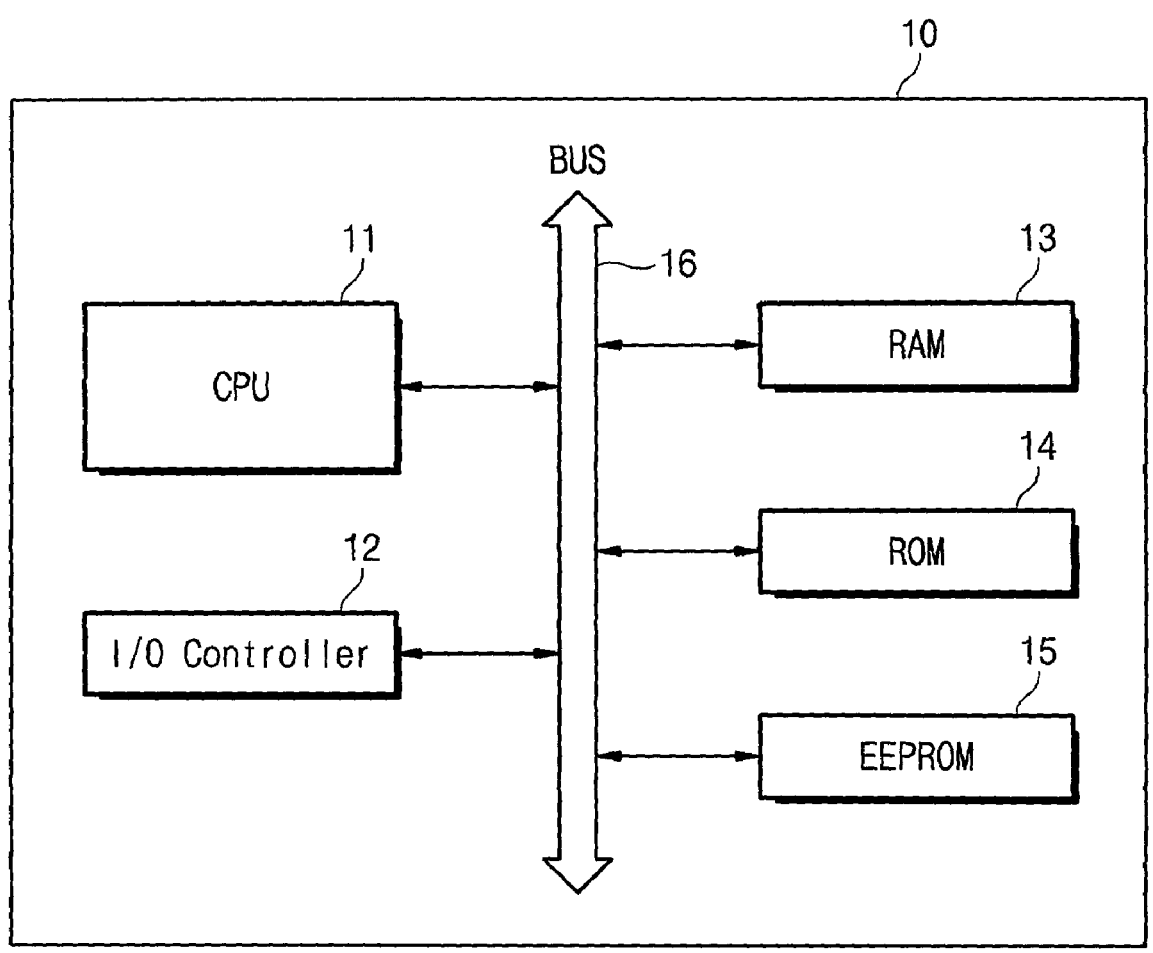
FIG. 1 is a diagram for an exemplary IC that may be used in a smart card.
Figure 2:
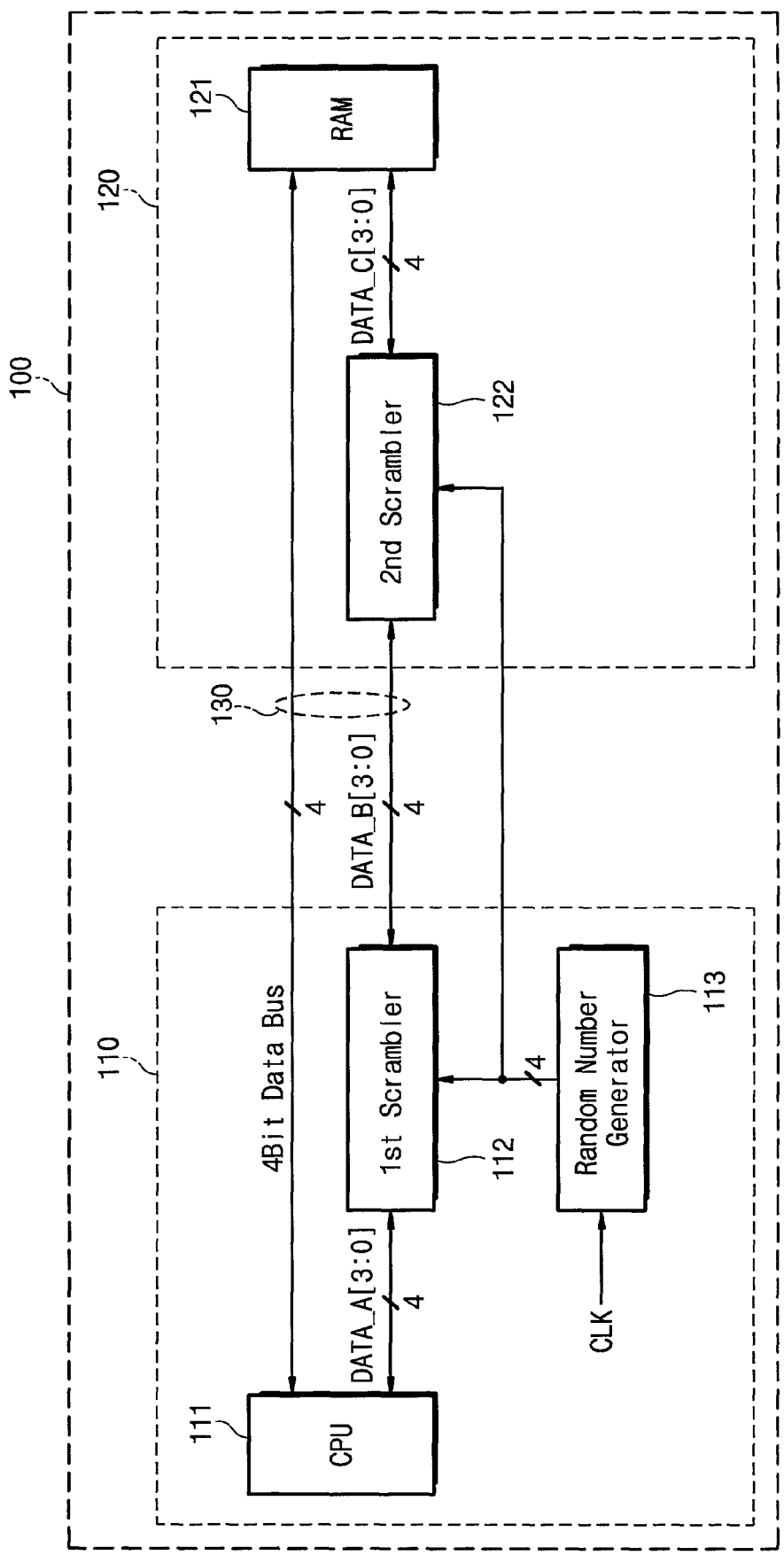
FIG. 2 is a diagram illustrating a structure of an IC for a smart card according to a preferred embodiment of the present invention.

FIG. 2 is a diagram illustrating a structure of an IC for a smart card according to a preferred embodiment of the present invention. An IC 100 includes a CPU circuit block 110 having a CPU 111, a RAM circuit block 120 having a RAM, and a data BUS 130 for transmitting and receiving data between the CPU and RAM circuit blocks 110 and 120. According to an embodiment of the present invention, the data transmitted and received between the CPU circuit block 110 and the RAM circuit block 120 includes blocks of 8 bits. It is to be understood, however, that the bit width of the data transmitted and received between the circuit blocks 110 and 120 can be variously changed. Also, although the present embodiment illustrates and explains circuits for protecting data transmitted and received between the CPU 111 and the RAM 121, it is to be appreciated that the present invention can be applied for protecting all data transmitted and received among circuit blocks of an IC, as well as data transmitted and received between the CPU and the RAM.

The CPU circuit block 110 further includes a first scrambler 112, and a random number generator 113. The random number generator 113 generates a 4-bit random number in response to a clock signal CLK. The first scrambler 112 changes an array of a low order 4-bit DATA_A[3:0] out of 8-bit data output from the CPU 111 according to the random number, outputs the changed array to the data BUS 130, restores an array of data bits, input from the RAM circuit block 120 through the data BUS 130, to an original array, and provides the restored array to the CPU 111.

The RAM circuit block 120 further includes a second scrambler 122. The second scrambler 122 restores an array of a 4-bit data, input from the CPU circuit block 110 through the data BUS 130 according to a random number generated from the random number generator 113, to an original array. The second scrambler 122 further provides the restored array to the RAM 121, changes an array of a low order 4-bit DATA_C[3:0] out of 8-bit data output from the RAM 121 according to the random number, and outputs the changed array to the data BUS 130. In another embodiment, the random number generator 113 can be included in the RAM circuit block 120.

Figure 3:
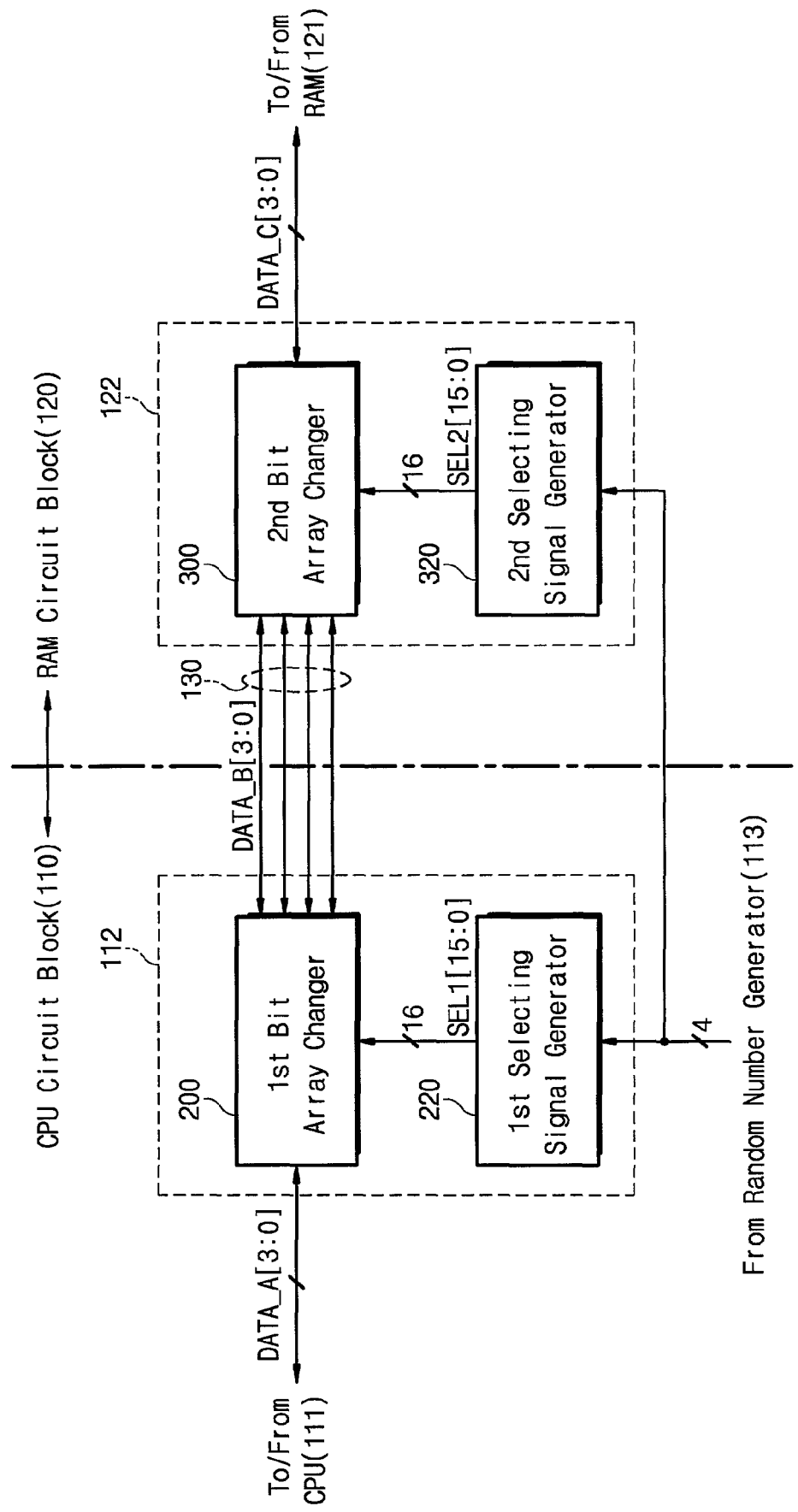
FIG. 3 is a block diagram illustrating architectures of the first and second scramblers in FIG. 2 according to embodiments of the present invention.

FIG. 3 is a block diagram illustrating a circuit structure of the first and second scramblers in FIG. 2 according to embodiments of the invention. The first scrambler 112 includes a first bit array changer 200 and a first selecting signal generator 220. The first selecting signal generator 220 generates a 16-bit selecting signal SEL1[15:0] in response to a 4-bit random number input from the random number generator 113. When data DATA_A[3:0] is output from the CPU 111, the first bit array changer 200 changes a bit array of the data DATA_A[3:0] in response to the selecting signal SEL1[15:0], and outputs DATA_B[3:0] to the data BUS 130. When the data DATA_B[3:0] is input through the data BUS 130, the first bit array changer 200 restores the bit array of the data DATA_B[3:0] to an original bit array in response to the selecting signal SEL1[15:0], and provides the restored array to the CPU 111.

The second scrambler 122 includes a second bit array changer 300 and a second selecting signal generator 320 similar to the first scrambler 112. The second selecting signal generator 320 generates a 16-bit selecting signal SEL2[15:0] in response to a 4-bit random number input from the random number generator 113. The selecting signal SEL1[15:0] output from the first selecting signal generator 220 and the selecting signal SEL2[15:0] output from the second selecting signal generator 320 are substantially identical with each other. When data DATA_C[3:0] is output from the RAM 121, the second bit array changer 300 changes a bit array of the data DATA_C[3:0] in response to the selecting signal SEL1[15:0] and outputs a DATA_B[3:0] to the data BUS 130. When the data DATA_B[3:0] is input through the data BUS 130, the second bit array changer 300 restores a bit array of the data DATA_B[3:0] to an original bit array in response to the selecting signal SEL2[15:0], and provides the restored bit array to the RAM 121.

According to the present invention, when data is transmitted from the CPU 111 to the RAM 121, the low order 4-bit data DATA_A[3:0] output from the CPU 111 is encrypted by the first bit array changer 200 (that is, the bit array is changed). The encrypted data DATA_B[3:0] is transmitted on the data BUS 130 to the second bit array changer 300, wherein the data is decrypted before being stored in RAM 121. Consequently, data DATA_A[3:0] output from the CPU 111 to the first bit array changer 200 and data DATA_C[3:0] provided from the second bit array changer 300 to the RAM 121 are identical with each other to give no influence for transmitting data. Since the data DATA_B[3:0] transmitted on the data BUS 130 is encrypted, even if the data BUS 130 is monitored by a hacker from the outside, the exposed data is different from the data substantially transmitted from the CPU 111 to the RAM 121, thereby securing the real data.

Likewise, a low order 4-bit data DATA_C[3:0], which output from the RAM 121 when data is transmitted from the RAM 121 to the CPU 111, is encrypted by the second bit array changer 300 (that is, the bit array is changed) to be DATA_B[3:0] which is transmitted on the data BUS 130. The encrypted data DATA_B[3:0] on the data BUS is decrypted by the first bit array changer 200 to be DATA_A[3:0], which is provided to the CPU 111. Consequently, the data DATA_C[3:0] output from the RAM 121 to the second bit array changer 300, and data DATA_A[3:0] provided from the first bit array changer 200 to the CPU 111 are identical with each other to give no influence to data transmission. Since the data DATA_B[3:0] loaded on the data BUS 130 is encrypted, even if the data BUS 130 is monitored by a hacker from the outside, the exposed data is different from the data substantially transmitted from the RAM 121 to the CPU 111, and thus, the data transmitted from the RAM 121 to the CPU 111 is secured.

Figure 4:
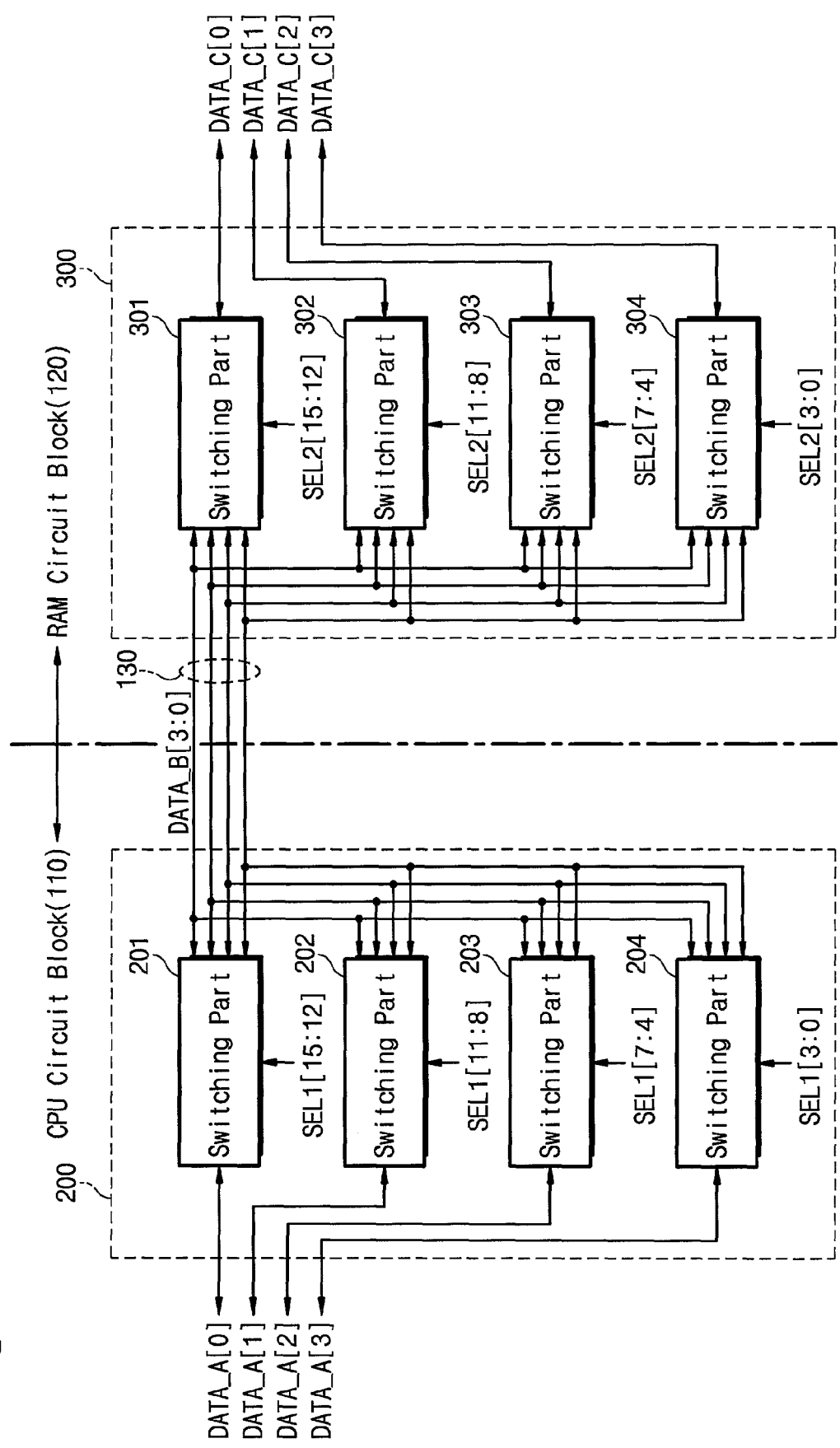
FIG. 4 is a block diagram illustrating an architecture of the first and second bit array changers in FIG. 3 according to embodiments of the present invention.
Figure 5:
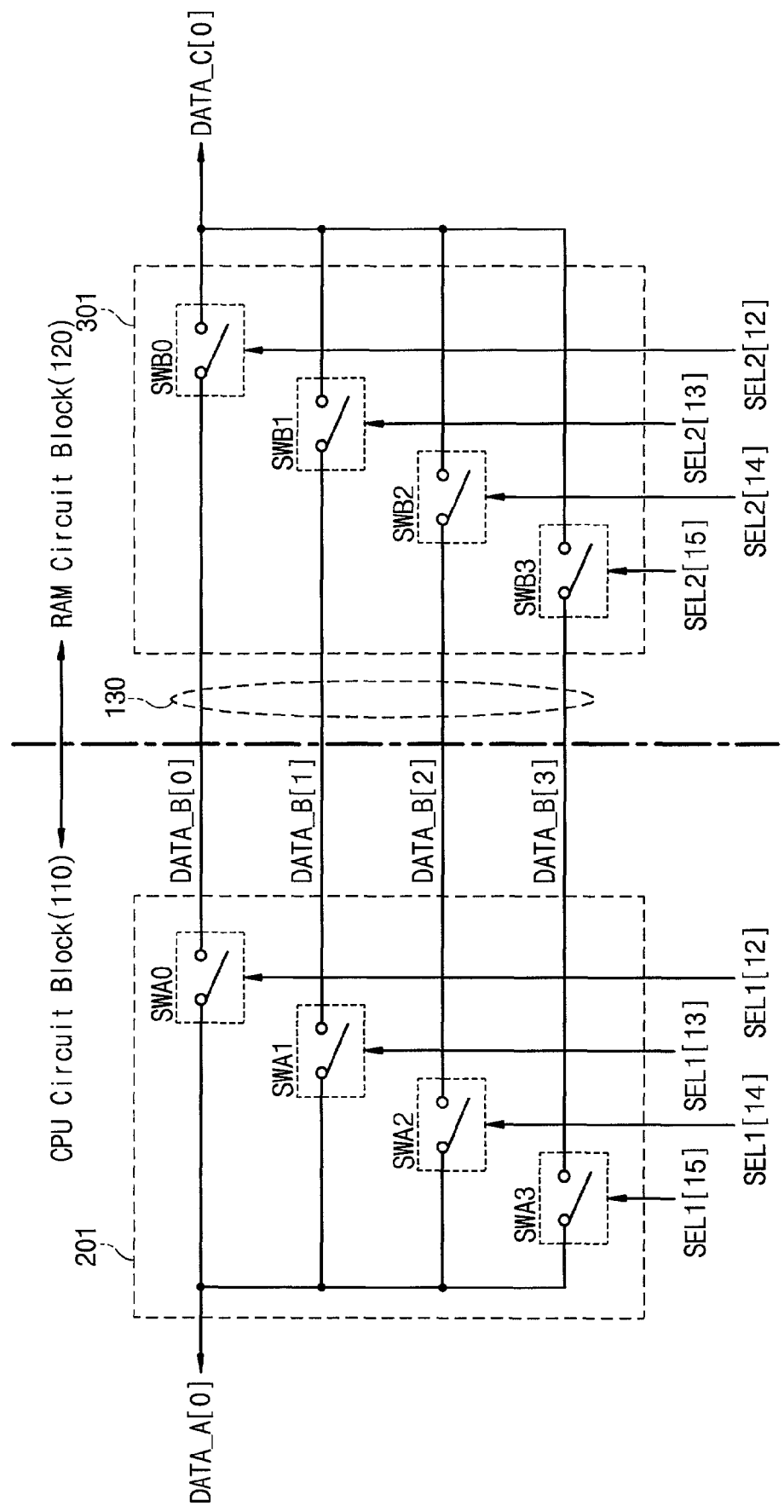
FIG. 5 is a diagram illustrating a circuit architecture of the switching parts in FIG. 4 according to an embodiment of the present invention.

FIGS. 4 and 5 are diagrams illustrating preferred structures and operations of the first and second bit array changers 200 and 300 for changing and restoring the bit arrays.

Referring to FIG. 4, the first bit array changer 200 includes four switching parts 201~204, and the second bit array changer 300 includes four switching parts 301~304 that correspond to the switching parts 201~204 in the first bit array changer 200, respectively.

The switching parts 201~204 in the first bit array changer 200 are controlled by corresponding 4-bit signals out of selecting signals SEL1[15:0] generated from the first selecting signal generator 220, respectively. That is, the switching part 201 is controlled by a selecting signal SEL1[15:12], the switching part 202 is controlled by a selecting signal SEL1[11:8], the switching part 203 is controlled by a selecting signal SEL1[7:4], and the switching part 204 is controlled by a selecting signal SEL1[3:0].

As explained above, the selecting signals SEL1[15:0] and SEL2[15:0], output from the first and second selecting signal generators 220 and 320, respectively, are identical with each other. Thus, the switching parts 201~204 in the first bit array changer 200, and the corresponding switching parts 301~304 in the second bit array changer 300 are controlled by the same signals, respectively.

Referring to FIG. 5, the switching part 201 includes four switches SWA0~SWA3, and the switching part 301 includes four switches SWB0~SWB3 corresponding to the switches SWA0~SWA3, respectively. The switches SWA0~SWA3 in the switching part 201 are controlled by corresponding signals out of the selecting signal SEL1[15:12] generated from the first selecting signal generator 220, respectively. The switches SWB0~SWB3 in the switching part 301 are controlled by corresponding signals out of selecting signals SEL2[15:12] generated from the second selecting signal generator 320, respectively. If the selecting signals SEL1[15:12] and SEL2[15:12] are logic '1's, the corresponding switches SWA0~SWA3 and SWB0~SWB3 become 'on', respectively. But, if logic '0's, the corresponding switches become 'off', respectively.

In a similar manner, the switching parts 202~204 and 302~304 includes four switches, respectively, identical with the switching parts 201 and 301 illustrated in FIG. 5, and controlled by corresponding selecting signals. Thus, a detailed discussion of the structure and operation of switching parts 202~204 and 302~304 are not needed for one of ordinary skilled in the art to understand their operation.

Table 1 shows exemplarily selecting signals SEL1[15:0] and SEL2[15:0] output from the first and second selecting signal generators 220 and 320 according to a 4-bit random number generated from a random number generator 113, and bit arrays of data DATA_B[3:0] provided on the data bus 130 thereby.

TABLE 1

| 4-bit random number | Selecting signals (SEL1[15:0] and SEL2[15:0]) | Bit array of DATA_B[3:0] |
| --- | --- | --- |
| 0000 | 1000 0010 0100 0001 | B0 B2 B1 B3 |
| 0001 | 1000 0010 0001 0100 | B0 B2 B3 B1 |
| 0010 | 1000 0001 0100 0010 | B0 B3 B1 B2 |
| 0011 | 1000 0001 0010 0100 | B0 B3 B2 B1 |
| 0100 | 0100 1000 0010 0001 | B1 B0 B2 B3 |
| 0101 | 0100 1000 0001 0010 | B1 B0 B3 B2 |
| 0110 | 0100 0001 1000 0010 | B1 B3 B0 B2 |
| 0111 | 0100 0001 0010 1000 | B1 B3 B2 B0 |
| 1000 | 0010 1000 0100 0001 | B2 B0 B1 B3 |
| 1001 | 0010 1000 0001 0100 | B2 B0 B3 B1 |
| 1010 | 0010 0100 1000 0001 | B2 B1 B0 B3 |
| 1011 | 0010 0001 0100 1000 | B2 B3 B1 B0 |
| 1100 | 0001 1000 0100 0010 | B3 B0 B1 B2 |
| 1101 | 0001 1000 0010 0100 | B3 B0 B2 B1 |
| 1110 | 0001 0100 1000 0010 | B3 B1 B0 B2 |
| 1111 | 0001 0100 0010 1000 | B3 B1 B2 B0 |

For example, when data DATA_A[3:0] output from the CPU 111 is he RAM 121 through the BUS 130, if the 4-bit random number generated from the random number generator 113 is '0000', the first and second selecting signals SEL1 [15:0] and SEL2[15:0] become '1000 0010 0100 0001'. As explained above, the first and second selecting signals SEL1 [15:0] and SEL2[15:0] become identical with each other. Since the first selecting signal SEL1[15:12] becomes '1000', the switch SWA3 of the switching part 201 becomes 'on', and the data DATA_A[0] output from the CPU 111 is provided on a third bit of the data BUS, i.e., on DATA_B[3]. With this method, data DATA_A[1], data DATA_A[2] and DATA_A[3], which are output from the CPU 111, are provided on data BUS DATA_B[1], data BUS DATA_B[2], and data BUS DATA_B[0], respectively.

Thus, when a bit array of the data DATA_A[3:0] output from the CPU 111 is 'B3 B2 B1 B0', another bit array of the data DATA_B[3:0] provided on the data BUS 130 becomes 'B0 B2 B1 B3'.

For example, if the data DATA_A[3:0] output from the CPU 111 is '1100', the data DATA_B[3:0] provided on the data BUS 130 becomes '0101'. Thus, although the data DATA_B[3:0] provided on the data BUS 130 is exposed to a hacker, since the exposed data is different from the output data DATA_A[3:0], the exposure of the real data can be prevented.

The data DATA_B[3:0] loaded on the data BUS 130 is transmitted to the RAM 121 by the following method. Like the above example, when a 4-bit random number generated from the random number generator 113 is '0000', the second selecting signal SEL2[15:0] is '1000 0010 0100 0001'. Since the second selecting signal SEL2[15:12] is '1000', the switch SWB3 of the switching part 301 becomes 'on', and a third bit of the data BUS, i.e., data loaded on the DATA_B[3] is provided as a bit data DATA_C[0] through the switch SWB3. With this method, data DATA_B[1] loaded on the data BUS 130 is provided to a first bit data DATA_C[1] of the RAM 121, data DATA_B[2] is provided to a second bit data DATA_C[2] of the RAM 121, and data DATA_B[0] is provided to a third bit data DATA_C[3] of the RAM 121.

Thus, when the data DATA_B[3:0] loaded on the data BUS 130 is 'B0 B2 B1 B3', the data DATA_C[3:0] provided to the RAM 121 become 'B3 B2 B1 B0'. This is identical with a bit array of the data DATA_A[3:0] output from the CPU 111. Therefore, data, which is transmitted from the CPU 111 to the RAM 121 through the data BUS 130, can't be exposed to a hacker, and is not influenced.

Figure 6A:
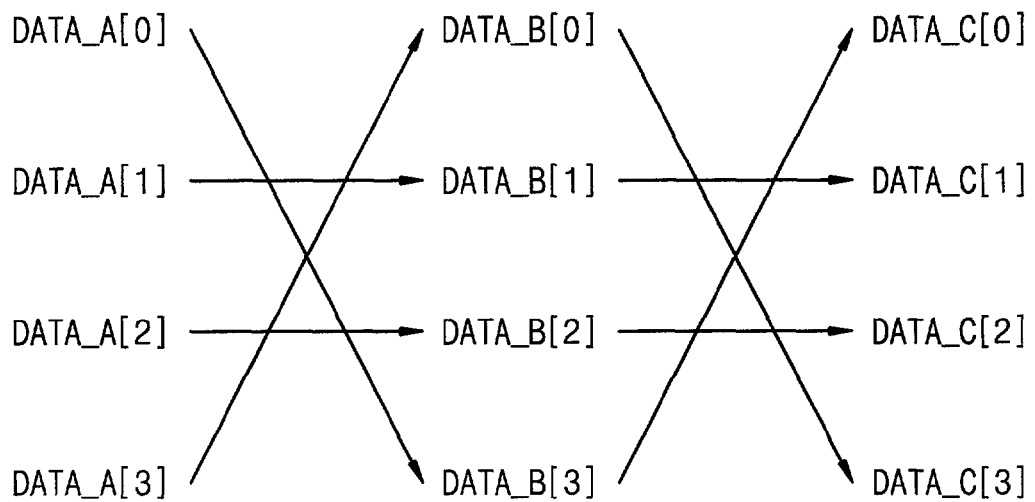
FIG. 6A is an exemplary diagram showing positional changes of data bits according to random numbers generated from a random number generator when data output from a CPU is transmitted to a RAM.

FIG. 6A is a diagram showing positional changes of data bits in the case that a random number generated from the random number generator 113 is '0000' when the data DATA_A[3:0] output from the CPU 111 is transmitted to the RAM 121. As shown in FIG. 6A, each position of the bits of the data DATA_A[3:0] output from the CPU 111 is changed according to the selecting signals SEL1[15:0] and provided on the data BUS 130. That is, the data DATA_A[0], the DATA_A[1], DATA_A[2], and DATA_A[3], which are output from the CPU 111, are changed to DATA_B[3], DATA_B[1], DATA_B[2], and DATA_B[0] of the data BUS 130, respectively. According to the selecting signal SEL1[15:0], DATA_B[0], DATA_B[1], DATA_B[2], and DATA_B[3], which are loaded on the data BUS 130 are changed to DATA_C[3], DATA_C[1], DATA_C[2], and DATA_C[0], respectively, and the changed data are provided to the RAM 121.

The method of transmitting data from the RAM 121 to the CPU 111 through the data BUS 130 is performed according to an inverse order from the above explained method of transmitting data from the CPU 111 to the RAM 121.

For example, if the 4-bit random number generated from the random number generator 13 is '0100', the first and second selecting signals SEL1[15:0] and SEL2[15:0] become '0100 1000 0010 0001'. As explained above, the first and second selecting signals SEL1[15:0] and SEL2[15:0] are identical with each other. Since the second selecting signal SEL2[15:12] is '0100', the switch SWB2 of the switching part 301 becomes 'on', and thus, the data DATA_C[0] output from the RAM 121 is provided on a second bit of the data BUS, i.e., on DATA_B[2]. With the same method, the data DATA_C[1], DATA_C[2], and DATA_C[3], which are output from the RAM 121, are provided on the data BUS, DATA_B[3], DATA_B[1] and DATA_B[0], respectively. Thus, when the bit array of the data DATA_C[3:0] output from the RAM 121 is 'B3 B2 B1 B0', another bit array of the data DATA_B[3:0] loaded on the data BUS 130 becomes 'B1 B0 B2 B3'.

For example, if the data DATA_C[3:0] output from the RAM 121 is '1100', the data DATA_B[3:0] loaded on the data BUS 130 becomes '0011'. Thus, although the data DATA_B[3.0] loaded on the data BUS 130 can be exposed to an unauthorized person, data exposure can be prevented, since the exposed data is different from the real data DATA_C[3:0] output from the RAM 121.

However, the data DATA_B[3:0] loaded on the data BUS 130 is transmitted to the CPU 111 with the following method. Like the above example, when a 4-bit random number generated from the random number generator 113 is '0100', the first selecting signal SEL1[15:0] is '0100 1000 0010 0001'. Since the first selecting signal SEL1[15:12] is '0100', the switch SWB2 of the switching part 201 becomes 'on', and a second bit of the data BUS, i.e., data loaded on the DATA_B[2] is provided as a bit data DATA_A[0] of the CPU 111 through the switch SWB2. With the method, the data DATA_B[0], DATA_B[1] and DATA_B[3] loaded on the data BUS 130 are provided to DATA_A[3], DATA_A[2], and DATA_A[1] of the CPU 111, respectively.

Therefore, when the data DATA_B[3:0] loaded on the data BUS 130 is 'B1 B0 B2 B3', data DATA_A[3:0] provided to the CPU 111 becomes 'B3 B2 B1 B0'. This is originally identical with a bit array of the data DATA_C[3:0] output from the RAM 121. Thus, data transmitted from the RAM 121 to the CPU 111 through the data BUS 130 can't be exposed to a hacker and is not influenced.

Figure 6B:
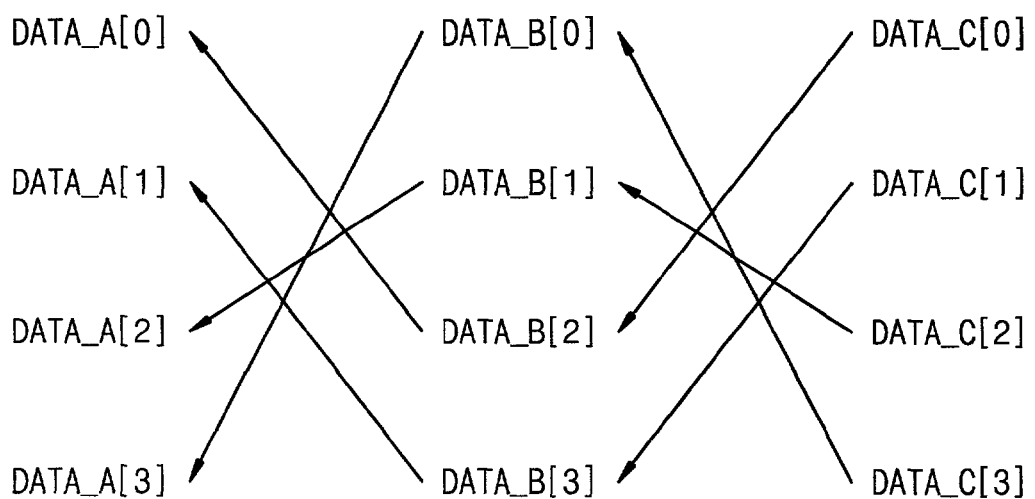
FIG. 6B is an exemplary diagram showing positional changes of data bits according to a random number generated from a random number generator when data output from a RAM is transmitted to a CPU.

FIG. 6B is a diagram showing positional changes of data bits in the case that the random number generated from the random number generator 113 is '0100' when the data DATA_C[3:0] output from the RAM 121 is transmitted to the CPU 111. As shown in FIG. 6B, each position of the bits of the data DATA_C[3:0] output from the RAM 121 is changed according to the selecting signal SEL2[15:0] and provided on the data BUS 130. That is, the DATA_C[0], the DATA_C[1], DATA_C[2], and DATA_C[3], output from the RAM 121 are changed to DATA_B[2], DATA_B[3], DATA_B[1], and to DATA_B[0] of the data BUS 130, respectively. According to the selecting signal SEL1[15:0], DATA_B[0], DATA_B[1], DATA_B[2], and DATA_B[3] loaded on the data BUS 130 are changed to DATA_A[3], DATA_A[2], DATA_A[0], and DATA_C[2], and the changed data are provided to the CPU 111, respectively.

However, since the random number generator 113 of the present invention operates by synchronizing with the clock signal CLK (FIG. 2), the first and second scramblers 112 and 122 perform operations of changing bit arrays per each clock. Thus, although data loaded on the data BUS 130 is exposed by a hacker, it is very difficult to decrypt the data, since a bit array per each clock is changed by a different method.

While this invention has been particularly shown and described with reference to preferred embodiments thereof, it will be understood by those skilled in the art that various changes in form and details may be made therein without departing from the spirit and scope of the invention as defined by the appended claims. For example, in the present embodiment, a bit array of a low order 4-bit data out of 8-bit data output from the CPU 111 is changed. But, although the entire 3-bit data or some bits of the 8-bit data are changed, the object of the present invention may be embodied by those skilled in the art.

According to the present invention, although input/output data among internal circuit blocks are exposed to an unauthorized person, since the exposed data is different from the original data, the input/output data among the internal circuit blocks can be protected.

What is claimed is:

1. A semiconductor integrated circuit comprising:
a first circuit;
a second circuit;
a data BUS for transmitting a plurality of data bits between the first and second circuits, wherein the plurality of data bits are N-bit data, and N is an integer;
a random number generator for generating a random number in response to a clock signal; and
first and second encryption/decryption circuits for changing an array of the plurality of data bits based on the random number generated by the random number generator per every clock cycle, wherein the arrays that are changed are low order K-bit data, wherein K is an integer less than N,
wherein the first encryption/decryption circuit encrypts data output from the first circuit based on the random number, outputs the encrypted data to the data BUS, decrypts an encrypted data received from the second encryption/decryption circuit based on the random number, and provides the decrypted data to the first circuit, and
the second encryption/decryption circuit decrypts the encrypted data received from the first encryption/decryption circuit based on the random number, provides the decrypted data to the second circuit, encrypts data output from the second circuit based on the random number, and outputs the encrypted data to the data BUS,
wherein each low order K-bit data is encrypted/decrypted in response to a respective portion of a selecting signal that is based upon the random number.

2. The semiconductor integrated circuit as claimed in claim 1, wherein the random number generator is comprised in a circuit block associated with one of the first encryption/decryption circuit and the second encryption/decryption circuit.

3. A semiconductor integrated circuit comprising:
a first circuit block comprising a processor circuit;
a second circuit block comprising a storage circuit; and
a data BUS for transmitting N-bit data between the first and second circuit blocks, wherein N is an integer,
wherein the first circuit block further comprises a random number generator for generating a random number in response to a clock signal, and a first encryption/decryption circuit for encrypting data output from the processor circuit according to the random number, outputting the encrypted data to the data BUS, decrypting encrypted data received from the storage circuit over the data BUS, and providing the decrypted data to the processor circuit, and
the second circuit block further comprises a second encryption/decryption circuit for decrypting the encrypted data received from the processor circuit over the data BUS according to the random number generated from the random number generator, providing the decrypted data to the storage circuit, encrypting data output from the storage circuit according to the random number, and outputting the encrypted data to the data BUS,
wherein the first and second encryption/decryption circuits change an array of the plurality of data bits based on the random number generated by the random number generator per every clock cycle,
wherein the arrays that are changed are low order K-bit data, wherein K is an integer less than N, and
wherein each low order K-bit data is changed in response to a respective portion of a selecting signal that is based upon the random number.

4. A semiconductor integrated circuit comprising:
a first circuit;
a second circuit;
a data BUS for transmitting a plurality of data bits between the first and second circuits, wherein the plurality of data bits are N-bit data, and N is an integer;
a random number generator for generating a random number in response to a clock signal;
a first scrambler for changing an array of the plurality of data bits output from the first circuit based on the random number, outputting the changed array to the data BUS, restoring an array of the plurality of data bits received from the second circuit over the data BUS to an original array based on the random number, and providing the restored array to the first circuit, and
a second scrambler for restoring the array of plurality of data bits received from the first circuit over the data BUS to an original array based on the random number, providing the restored array to the second circuit, changing the array of the plurality of data bits output from the second circuit based on the random number, and outputting the changed array to the data BUS,
wherein the first and second scramblers change an array of the plurality of data bits based on the random number generated by the random number generator per every clock cycle, wherein the arrays that are changed are low order K-bit data, wherein K is an integer less than N, and
wherein each low order K-bit data is changed in response to a respective portion of a selecting signal that is based upon the random number.

5. The semiconductor integrated circuit as claimed in claim 4, wherein the first scrambler comprises:
a first generator for generating first selecting signals corresponding to the random number; and
a first bit array changer for changing the array of plurality of data bits output from the first circuit based on the first selecting signals, outputting the changed array to the data BUS, restoring the array of plurality of data bits received from the second circuit over the data BUS to the original array based on the first selecting signals, and providing the restored array to the first circuit.

6. The semiconductor integrated circuit as claimed in claim 5, wherein the first bit array changer comprises a plurality of first switching circuits corresponding to transmitting and receiving the plurality of data bits, respectively, each of the plurality of first switching circuits for connecting a corresponding one of the plurality of data bits input/output to/from the first circuit with a bit corresponding to the first selecting signals out of bits of the data BUS.

7. The semiconductor integrated circuit as claimed in claim 6, wherein each of the plurality of first switching circuits:
outputs a corresponding one of the plurality of data bits output from the first circuit when data is output from the first circuit, as a bit corresponding to the first selecting signals out of bits of the data BUS, and
provides a bit corresponding to the first selecting signals out of data bits loaded on the data BUS when data is input from the data BUS, as a corresponding one of the plurality of data bits input to the first circuit.

8. The semiconductor integrated circuit as claimed in claim 6, wherein each of the plurality of first switching circuits comprises a plurality of switches that are connected between a plurality of bits of the data BUS and a corresponding one of plurality of data bits input/output to/from the first circuit, respectively, for operating in response to the first selecting signals.

9. The semiconductor integrated circuit as claimed in claim 5, wherein the second scrambler comprises:
a second generator for generating second selecting signals corresponding to the random number; and
a second bit array changer for restoring the array of plurality of data bits received from the first circuit over the data BUS to the original array based on the second selecting signals, providing the restored array to the second circuit, changing the array of data bits output from the second circuit based on the second selecting signals, and outputting the changed array to the data BUS.

10. The semiconductor integrated circuit as claimed in claim 9, wherein the first selecting signals and the second selecting signals are identical with each other.

11. The semiconductor integrated circuit as claimed in claim 9, wherein the second bit array changer comprises a plurality of second switching circuits corresponding to the transmitted and received data bits, each of the second switching circuits for connecting a corresponding one of data bits input/output to/from the second circuit with bits corresponding to the second selecting signals out of bits of the data BUS.

12. The semiconductor integrated circuit as claimed in claim 11, wherein each of the second switching circuits:
outputs a corresponding one of data bits output from the second circuit when data is output from the second circuit, as a bit corresponding to the second selecting signal out of bits of the data BUS, and
provides a bit corresponding to the second selecting signals out of data bits loaded on the data BUS when data is input from the data BUS, as a corresponding one of data bits input to the second circuit.

13. The semiconductor integrated circuit as claimed in claim 12, wherein each of the second switching circuits comprises a plurality of switches that are connected between a plurality of bits of the data BUS and a corresponding one of data bits input/output to/from the second circuit, respectively, for operating in response to the second selecting signals.

14. A smart card comprising:
a first circuit;
a second circuit;
a data BUS for transmitting a plurality of data bits between the first and second circuit, wherein the plurality of data bits are N-bit data, and N is an integer;
a random number generator for generating a random number in response to a clock signal;
a first scrambler for changing an array of the plurality of data bits output from the first circuit based on the random number, outputting the changed array to the data BUS, restoring an array of the plurality of data bits received from the second circuit over the data BUS to an original array based on the random number, and providing the restored array to the first circuit; and
a second scrambler for restoring an array of the plurality of data bits received from the first circuit over the data BUS to an original array based on the random number, providing the restored data to the second circuit, changing an array of the plurality of data bits output from the second circuit based on the random number, and outputting the changed array to the data BUS,
wherein the first and second scramblers change an array of the plurality of data bits based on the random number generated by the random number generator per every clock cycle, wherein the arrays that are changed are low order K-bit data, wherein K is an integer less than N, and wherein each low order K-bit data is changed in response to a respective portion of a selecting signal that is based upon the random number.

15. The smart card as claimed in claim 14, wherein the first scrambler comprises:
a first generator for generating first selecting signals corresponding to the random number; and
a first bit array changer for changing the array of the plurality of data bits output from the first circuit based on the first selecting signals, outputting the changed array to the data BUS, restoring the array of data bits received from the second circuit over the data BUS based on the first selecting signals, and providing the restored array to the first circuit.

16. The smart card as claimed in claim 15, wherein the second scrambler comprises:
a second generator for generating second selecting signals corresponding to the random number; and
a second bit array changer for restoring the array of data bits input from the first circuit over the data BUS to the original array based on the second selecting signals, providing the restored array to the second circuit, changing the array of data bits output from the second circuit based on the second selecting signals, and outputting the changed array to the data BUS.

17. The smart card as claimed in claim 16, wherein the first selecting signals generated from the first generator and the second selecting signals generated from the second generator are identical with each other.

18. The smart card as claimed in claim 16, wherein the first bit array changer comprises a plurality of first switching circuits corresponding to the transmitting and receiving data bits, respectively, each of the plurality of first switching circuits for connecting a corresponding one of data bits input/output to/from the first circuit with a bit corresponding to the first selecting signals out of bits of the data BUS.

19. The smart card as claimed in claim 18, wherein each of the first switching circuits:
outputs a corresponding one of data bits output from the first circuit when data is output from the first circuit, as a bit corresponding to the first selecting signals out of bits of the data BUS, and
provides a bit corresponding to the first selecting signals out of data bits loaded on the data BUS when data is input from the data BUS, to a corresponding one of data bits input to the first circuit.

20. The smart card as claimed in claim 18, wherein each of the first switching circuits comprises a plurality of switches that are connected between a plurality of bits of the data BUS and a corresponding one of data bits input/output to/from the first circuit, respectively, for operating in response to the first selecting signals.

21. The smart card as claimed in claim 16, wherein the second bit array changer comprises a plurality of second switching circuits corresponding to bits of the transmitted and received data, each of the plurality of second switching circuits for connecting a corresponding one of data bits input/output to/from the second circuit with bits corresponding to the second selecting signals out of bits of the data BUS.

22. The smart card as claimed in claim 20, wherein each of the second switching circuits:
  outputs a corresponding one of data bits output from the second circuit when data is output from the second circuit, as a bit corresponding to the second selecting signal out of bits of the data BUS, and
  provides a bit corresponding to the second selecting signals out of data bits loaded on the data BUS when data is input from the data BUS, as a corresponding one of data bits input to the second circuit.

23. The smart card as claimed in claim 21, wherein each of the second switching circuits comprises a plurality of switches that are connected between a plurality of bits of the data BUS and a corresponding one of data bits input/output to/from the second circuit, respectively, for operating in response to the second selecting signals.

24. A semiconductor integrated circuit comprising:
  a first circuit;
  a second circuit;
  a data BUS for transmitting a plurality of data bits between the first and second circuit, wherein the plurality of data bits are N-bit data, and N is an integer;
  a random number generator for generating a random number in response to a clock signal;
  a first scrambler for partially changing an array of the plurality of data bits output from the first circuit based on the random number and outputting the changed array to the data BUS; and
  a second scrambler for restoring the array data bits whose array is changed by the first scrambler, out of data bits input from the first circuit through the data BUS based on the random number to an original array, providing the restored array to the second circuit, partially changing an array out of data bits output from the second circuit based on the random number, and outputting the changed array to the data BUS,
  wherein the first scrambler restores some bits whose array is changed by the second scrambler, out of data bits input from the second circuit over the data BUS based on the random number, to an original array, and provides the restored array to the first circuit, and the first and second scramblers change an array of the plurality of data bits based on the random number generated by the random number generator per every clock cycle,
  wherein the arrays that are changed are low order K-bit data, wherein K is an integer less than N, and
  wherein each low order K-bit data is changed in response to a respective portion of a selecting signal that is based upon the random number.

25. The semiconductor integrated circuit as claimed in claim 24, wherein the first scrambler comprises:
  a first generator for generating first selecting signals corresponding to the random number; and
  a first bit array changer for partially changing the array of data bits output from the first circuit according to the first selecting signals, outputting the changed array to the data BUS, restoring the array of some bits whose array is changed by the second scrambler, out of data bits input from the second circuit block through the data BUS based on the first selecting signals, to an original array, and providing the restored array to the first circuit.

26. The semiconductor integrated circuit as claimed in claim 25, wherein the second scrambler comprises:
  a second generator for generating second selecting signals corresponding to the random number; and
  a second bit array changer for restoring the array of some bits whose array is changed by the first scrambler, out of data bits input from the first circuit over the data BUS the original array based on the second selecting signals, providing the restored array to the second circuit, partially changing the array of data bits output from the second circuit based on the second selecting signals, and outputting the changed array to the data BUS.

27. The semiconductor integrated circuit as claimed in claim 26, wherein the first selecting signals and the second selecting signals are identical with each other.

28. The semiconductor integrated circuit as claimed in claim 26, wherein bits whose bit arrays are restored by the first and second bit array changers, out of the N bits data are the K low order bits.

29. The semiconductor integrated circuit as claimed in claim 28, wherein the first bit array changer comprises a plurality of first switching circuits corresponding to bits of the K-bit data, each of the first switching circuits for connecting corresponding bits out of K low order bits of data input/output to/from the first circuit, to a bit corresponding to the first selecting signals out of K low order bits of the data BUS.

30. The semiconductor integrated circuit as claimed in claim 29, wherein each of the first switching circuits:
  outputs a corresponding one of K low order bits of data output from the first circuit when data is output from the first circuit, as a bit corresponding to the first selecting signals out of K low order bits of the data BUS, and
  provides a bit corresponding to the first selecting signals out of data bits loaded on the data BUS when data is input from the data BUS, as a corresponding one of data bits input to the first circuit.

31. The semiconductor integrated circuit as claimed in claim 30, wherein each of the first switching circuits comprises a plurality of switches that are connected between K low order bits of the data BUS and a corresponding one of K low order bits of data input/output to/from the first circuit, respectively, for operating in response to the first selecting signals.

32. The semiconductor integrated circuit as claimed in claim 28, wherein the second bit array changer comprises a plurality of second switching circuits corresponding to K bits data, respectively, each of the second switching circuits for connecting a corresponding one of K low order bits of data input/output to/from the second circuit, to a bit corresponding to the second selecting signals out of K low order bits of the data BUS.

33. The semiconductor integrated circuit as claimed in claim 32, wherein each of the second switching circuits:
  outputs a corresponding one of K low order bits of data output from the second circuit when data is output from the second circuit, as a bit corresponding to the second selecting signals out of K low order bits of the data BUS, and
  provides a bit corresponding to the second selecting signals out of K low order bits of data loaded on the data BUS when data is input from the data BUS, as a corresponding one of K low order bits of data input to the second circuit.

34. The semiconductor integrated circuit as claimed in claim 33, wherein each of the second switching circuits comprises a plurality of switches that are connected between K low order bits of the data BUS and a corresponding one of K low order bits of data input/output to/from the second circuit, respectively, for operating in response to the second selecting signals.

35. A method of transmitting internal data of a semiconductor memory device having one chip composed of a first circuit block, a second circuit block, and a data BUS for transmitting N-bit data between the first and second circuit blocks, wherein N is an integer, comprising the steps of:
- outputting data using the first circuit block;
- changing a bit array of the data output from the first circuit block based on a random number generated in response to a clock signal;
- transmitting the data whose bit array is changed to the data BUS;
- restoring a bit array of data transmitted on the data BUS to an original array based on the random number;
- outputting the data whose bit array is restored, to the second circuit block
- outputting data using the second circuit block;
- changing a bit array of the data output from the second circuit based on the random number;
- transmitting the data whose bit array is changed to the data BUS;
- restoring a bit array of data transmitted on the data BUS to an original array based on the random number; and
- inputting the data whose bit array is restored, to the first circuit block, wherein changing the bit array of the data output from the first and second circuits based on the random number is performed by the random number generator per every clock cycle, wherein the bit arrays that are changed are low order K-bit data, wherein K is an integer less than N, and wherein each low order K-bit data is changed in response to a respective portion of a selecting signal that is based upon the random number.

36. The method as claimed in claim 35, wherein:
the step of changing the bit array changes some bits out of data output from the second circuit block; and
the step of restoring the bit array restores bits whose bit array is changed in the step of changing the bit array, out of the data loaded on the data BUS, to the original array.

37. The method as claimed in claim 35, wherein:
the step of changing the bit array of data changes some bits out of data output from the second circuit block; and
the step of restoring the bit restores bits whose bit array is changed in the step of changing the bit array to the original array.

* * * * *